United States Patent [19]

Isaia et al.

[11] 4,223,878
[45] Sep. 23, 1980

[54] MODULAR RECOIL MECHANISM

[75] Inventors: Robert L. Isaia, Roanoke; Francis D. Bell, Peoria; Robert L. Shelby, Chillicoth, all of Ill.

[73] Assignee: Caterpillar Tractor Co., Peoria, Ill.

[21] Appl. No.: 971,619

[22] Filed: Dec. 20, 1978

Related U.S. Application Data

[63] Continuation of Ser. No. 813,719, Jul. 7, 1977, abandoned.

[51] Int. Cl.² .................... B60G 11/56; B62D 55/30
[52] U.S. Cl. ................................... 267/34; 305/10
[58] Field of Search ............... 267/34, 35, 70, 71, 267/174, 177; 188/352; 305/10, 31; 92/109, 255; 403/2, 11, 287; 141/97, 390

[56] References Cited

U.S. PATENT DOCUMENTS

| 2,683,064 | 7/1954 | Land | 305/31 |
|---|---|---|---|
| 3,328,018 | 6/1967 | Austgen | 267/34 |
| 3,337,208 | 8/1967 | Johansson et al. | 305/10 |
| 3,574,998 | 4/1971 | Bredow et al. | 92/109 |
| 3,829,172 | 8/1974 | Oestmann | 305/10 |
| 3,915,509 | 10/1975 | Bell et al. | 305/10 |
| 3,920,286 | 11/1975 | Bell | 305/10 |
| 3,938,851 | 2/1976 | Shelby et al. | 305/10 |

FOREIGN PATENT DOCUMENTS 213598  5/1968  U.S.S.R. .................. 305/10

Primary Examiner—Edward R. Kazenske
Attorney, Agent, or Firm—Phillips, Moore, Weissenberger, Lempio & Majestic

[57] ABSTRACT

A vehicle recoil mechanism includes a two-part shaft, a collar being slidable on one part of the shaft and in operative engagement with a recoil spring, the other part of the shaft being associated with a fluid chamber, so that upon wear on the shaft by movement of the collar relative thereto, only the one part of the shaft need be replaced, without interfering with the fluid chamber.

3 Claims, 2 Drawing Figures

MODULAR RECOIL MECHANISM

This is a continuation of Ser. No. 813,719, filed July 7, 1977 now abandoned.

BACKGROUND OF THE INVENTION

This invention relates to recoil mechanisms, and more particularly, to a recoil mechanism which incorporates shaft means having a collar slidable thereon and in operative association with a recoil spring.

In a known type of recoil and track tensioning apparatus a one-piece shaft has a collar slidably mounted thereon, the collar being in operative association with a recoil spring. The shaft is also in operative association with a fluid chamber into which substantially incompressible fluid may be introduced, so that the mechanism provides the function of tensioning a track of a vehicle with which it is associated. In general, over a period of time, the movement of the collar relative to the shaft under recoil operation of the apparatus provides a certain degree of wear on the shaft. In general, in order to gain complete access to the shaft to replace it, certain sealing relations in the area of the shaft and chamber must be broken, and then reestablished during reassembly of the apparatus.

SUMMARY OF THE INVENTION

The present invention is directed to overcoming one or more of the problems as set forth above.

Broadly stated, the invention is in a recoil mechanism including shaft means having movable collar means mounted thereon in operative association with a recoil spring, and fluid chamber defining means operatively associated with the shaft means. The improvement comprises the shaft means comprising first and second shaft portions in generally end-to-end relation. The first shaft portion has the collar means mounted thereon, the second shaft portion being operatively associated with the fluid chamber defining means. The first shaft portion is readily removable from the second shaft portion with the second shaft portion remaining in operative association with the fluid chamber defining means.

BRIEF DESCRIPTION OF THE DRAWINGS

Other objects of the invention will become apparent from a study of the following specification and drawings, in which.

DESCRIPTION OF THE PREFERRED EMBODIMENT

Figures 1, 2:
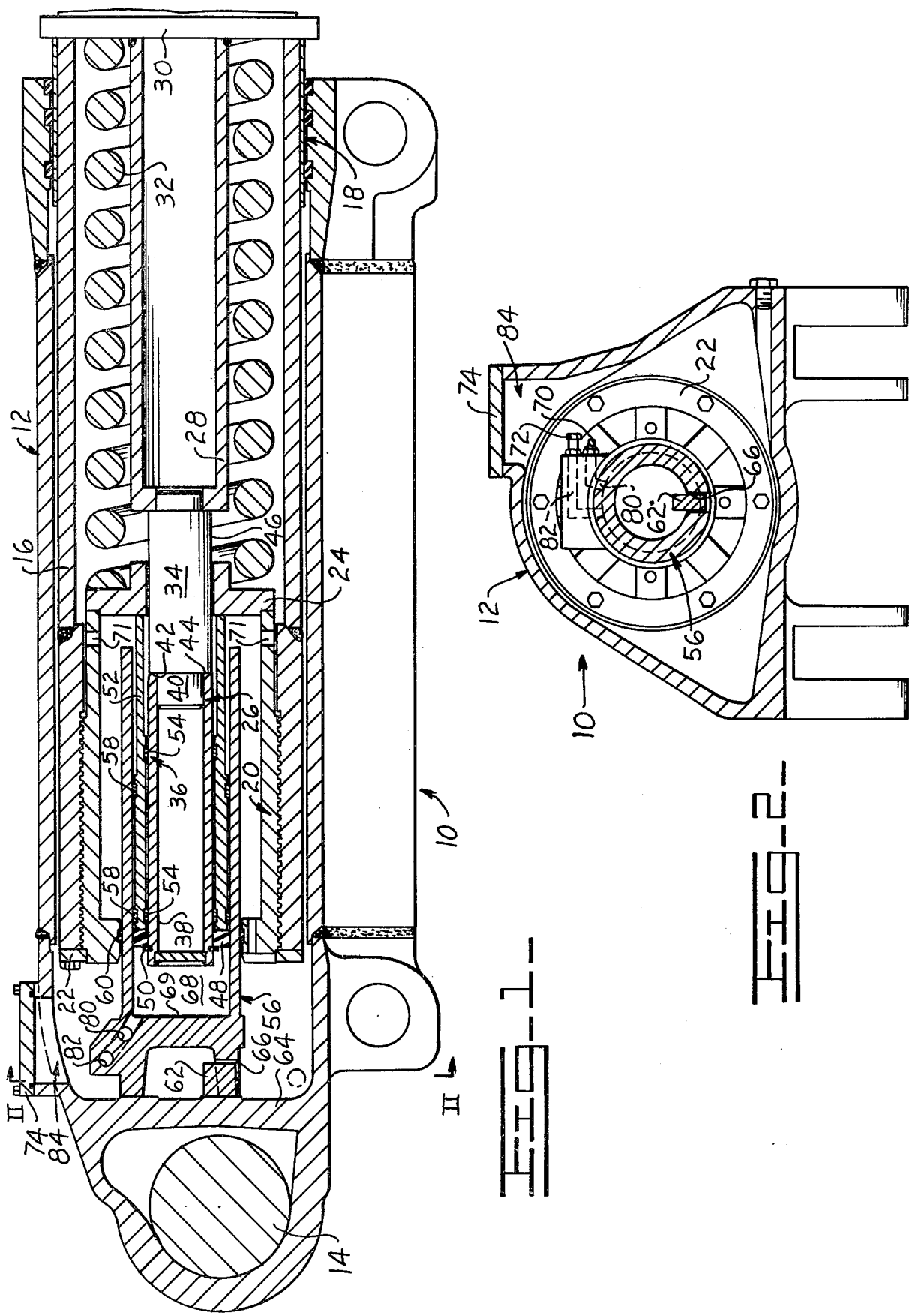
FIG. 1 is a sectional elevation of the apparatus incorporating the present invention.
FIG. 2 is a sectional view taken along the line II—II of FIG. 1.

Shown in FIGS. 1 and 2 is the track-tensioning and recoil mechanism 10 for operative association with the wheels of a vehicle. The mechanism 10 includes an outer generally tubular member 12 secured to the pivot shaft 14 of a vehicle, and an inner generally tubular member 16 slidably disposed therewithin by means of sleeve bearings 18, the inner tubular member 16 being operatively associated with the front idler of a vehicle (not shown). The inner tubular member 16 is internally threaded, and an externally threaded member 20 is in threaded engagement with the tubular member 16, and is retained therein by a safety ring 22 bolted to the tubular member 16. The externally threaded member 20 is in contact with a collar 24 which is slidably disposed on shaft means 26. The shaft means 26 are in contact with an extension 28 secured to an end plate 30 in turn secured to the tubular member 16. A helical recoil spring 32 is disposed about the extension 28 and is in contact with the end plate 30 and the collar 24.

The shaft means 26, it will be seen, is made up of two shaft portions 34, 36, which are in generally end-to-end, normally abutting contact. The shaft portion 34 is the portion which has the collar 24 movably mounted thereon. The shaft portion 34 is solid, while the shaft portion 36 is hollow, defining an elongated bore 38 therein. The shaft portion 34 defines a protrusion 40 which seats into the bore 38 of the shaft portion 36, with the shaft portion 34 defining a radial flange 42 which is in contact with the annular end surface 44 of the shaft portion 36. The shaft portions 34, 36 are readily removable from each other, with the shaft means 26 in a free state, slince they are not secured to each other, but rather the protrusion 40 is a free fit into the bore 38.

It will be seen that the shaft portions 34, 36 define shaft means 26 of generally cylindrical overall configuration, with the overall cylindrical surface 46 of the shaft means being substantially smooth in configuration, with the shaft portions 34, 36 in abutting contact.

An annular seal 48 is retained on the shaft portion 38 by means of a spring clip 50. A sleeve 52 is disposed about the shaft means 26, and is in sealing relation with the shaft portion 36 by means of seals 54. The sleeve 52 is in abutting contact with the collar 24. A frame means in the form of a guide tube member 56 is disposed about the sleeve 52, and is in sealing relation with the sleeve 52 by means of seals 58, the annular seal 48 also being in sealing engagement with the inner surface of the guide tube member 56. The outer surface of the guide tube member 56 is in sealing relation with the externally threaded member 20 by means of seal 60. The guide tube member 56 is maintained in a proper position by a lug 62 welded to an abutment plate 64 of the tubular member 12, and a mating recess 66 formed in an extended portion of the guide tube member 56 to accept the lug 62.

It will be seen that the guide tube member 56, shaft portion 36, and annular seal 48 together define a chamber 68. Pressurized, substantially incompressible fluid may be introduced into the chamber 68 through a fitting 70, and pressure may be relieved therefrom by means of a fitting 72. Access is provided to the fittings 70, 72 by removal of an access plate 74.

Upon introduction of such fluid into the chamber 68, the fluid acts on the shaft portion 36 and on the surface 69 of the guide tube member 56 to move the tubular members 12, 16 to tension a track a vehicle.

The tubular member 16 is substantially filled with oil, passages 71 being provided on the externally threaded member 20 to allow flow therethrough, so that oil generally surrounds the shaft portion 34 in the area of the collar 24. Upon leftward movement of the tubular member 16 relative to the tubular member 12, the shaft portion 36, moving with the tubular member 16, moves into the chamber 68, so that the substantially incompressible fluid in the chamber 68 acts on the annular seal 48, which in turn acts on the sleeve 52, to urge the collar 24 rightwardly along the shaft portion 34. The collar 24 is moved away from contact with the externally threaded member 20, and in this way, the spring 32 is compressed between the collar 34 and the end plate 30. Extension of the spring 32 of course moves the parts in the opposite manner.

It will therefore be seen that the collar 24 slides along the shaft portion 34, and over a relatively long period of time, wear will occur on the shaft portion 34. The oil generally surrounding the shaft portion 34 aids in reducing wear on that shaft portion 34. When it is desired that access be gained to the shaft means 26 so as to provide replacement thereof to compensate for the wear of the shaft portion 34, the tubular portion 12 is initially removed from the tubular portion 16. Next, the guide tube member 56, shaft portion 36, sleeve and seals 48, 54, 58 operatively associated therewith are removed as a unit. Thus, it will be seen that the sealing means operatively associating these parts is not interfered with. Access is then easily provided to the shaft portion 34, which can be replaced as appropriate. In the meantime, it should be realized that the externally threaded member 20 remains in place within the tubular portion 16, in contact with the collar 24, so that the spring 32 is maintained in a safe, compressed state. Thus, the above operation can take place without any danger to the workmen undertaking such repair.

Upon removal and replacement of the shaft portion 34, the unit including guide tube member 56, sleeve 52, and shaft portion 36, and seals 48,54,58 associated therewith, may be replaced. The tubular member 12 is then installed on the tubular member 16.

As shown in FIG. 2, pressure in the fluid chamber 68 will act in the bores 80,82 acting on the fittings 70, 72 which are urged in a rightward direction. The fittings 70, 72 are retained in such position relative to the tubular member 12 by the lug 62 and the recess 66 described above. It should be noted that the access plate 74 is in a position such that the fittings 70, 72 are not urged toward such access plate 74 by fluid pressure in the chamber 68, but rather are urged in a direction removed therefrom, toward a sidewall of the tubular member 12. Thus, if a fitting under pressure is removed by the operator, such pressure will not act to drive the fitting through the access opening 84, but rather such fitting will be driven against the sidewall of the tubular member 12, avoiding possible injury to the workman.

The embodiments of the invention in which an exclusive property or privilege is claimed are defined as follows:

1. In a recoil mechanism including a shaft having a movable collar slidably mounted thereon in operative contact with a recoil spring, and fluid chamber defining means operatively associated with the shaft, the improvement comprising the shaft having first and second shaft portions in generally end-to-end, normally abutting contact; the outer surfaces of the first and second shaft portions defining a generally cylindrical overall configuration, with the overall cylindrical configuration of the shaft being substantially smooth, with the first and second shaft portions in abutting contact; the first shaft portion having the collar mounted thereon, the second shaft portion being operatively associated with the fluid chamber defining means, the shaft including means for disengaging the first shaft portion readily and directly axially from the second shaft portion with the second shaft portion remaining in operative association with the fluid chamber defining means; wherein said disengaging means includes an elongated bore defined by said second shaft portion and a protrusion defined by said first shaft portion which free-fittingly, nonsecuringly, and axially fits into the bore of the second shaft portion with the first and second shaft portions in abutting contact; and wherein the fluid chamber defining means comprise seal means in operative contact with the second shaft portion, which seal means remains in contact with said second shaft portion as said first shaft portion is directly axially removed from the second shaft portion.

2. The mechanism of claim 1, wherein the first shaft portion is solid.

3. The mechanism of claim 1 and further comprising oil generally surrounding the first shaft portion in the area of the collar and wherein the oil is positioned between the collar and the first shaft portion to reduce the wear of the first shaft portion as the collar slides thereon.

* * * * *